(12) United States Patent
Robert

(10) Patent No.: US 7,487,541 B2
(45) Date of Patent: Feb. 3, 2009

(54) FLOW-BASED METHOD FOR TRACKING BACK SINGLE PACKETS

(75) Inventor: Jean-Marc Robert, Ottawa (CA)

(73) Assignee: Alcatel Lucent, Paris (FR)

( * ) Notice: Subject to any disclaimer, the term of this patent is extended or adjusted under 35 U.S.C. 154(b) by 686 days.

(21) Appl. No.: 10/730,926

(22) Filed: Dec. 10, 2003

(65) Prior Publication Data

US 2005/0132219 A1 Jun. 16, 2005

(51) Int. Cl.
*G06F 11/00* (2006.01)

(52) U.S. Cl. .............................. 726/22; 726/6; 726/26; 709/224; 713/187

(58) Field of Classification Search ...................... 726/6, 726/22, 26; 709/224, 222
See application file for complete search history.

(56) References Cited

U.S. PATENT DOCUMENTS

| | | | |
|---|---|---|---|
| 6,978,223 B2 * | 12/2005 | Milliken ...................... | 702/182 |
| 2002/0032871 A1 * | 3/2002 | Malan et al. ................ | 713/201 |
| 2002/0042837 A1 * | 4/2002 | Ebata et al. ................. | 709/232 |
| 2004/0030927 A1 * | 2/2004 | Zuk ............................ | 713/201 |

OTHER PUBLICATIONS

Snoeren et al "Hash-Based IP Traceback" Computer Communication Review,Association for computing machinery. New York, US, vol. 31, No. 4□□(Aug. 27, 2001),p. 1-13□□XP002952661□□ISSN: 0146-4833□□* pp. 1-8*.*
Snoeren et al(hash based IP traceback, Aug. 27, 2001).*
Snoeren et al, Hash based IP Traceback Aug. 2001.*
Duffield, N.G., et al., Trajectory Sampling for Direct Traffic Observation, AT&T Labs, Oct. 2000.
Mahajan, Ratul, et al., Controlling High Bandwidth Aggregates in the Network, AT&T Labs, Jul. 2002.
Snoeren, Axlex C., et al., Hash-Based IP Traceback, BBN Technologies, Feb. 7, 2001.
Yaar, Abraham, et al., Pi: A Path Identification Mechanism to Defend Against DDoS Attacks, Carnegie Mellon University, 2003.
Lipson, Howard F., Tracking and Tracing Cyber-Attacks: Technical Challenges and Global Policy Issues, Carnegie Mellon, Nov. 2002.
Savage, Stefan, et al., Practical Network Support for IP Traceback, University of Washington, Seattle.
Snoeren, Alex C. et al., Hash-Based IP Traceback, BBN Technologies, Aug. 2001.
Bellovin, Steve, et al., ICMP Traceback Messages, AT&T Labs Research, Apr. 2002.

* cited by examiner

*Primary Examiner*—Nasser G Moazzami
*Assistant Examiner*—Fikremariam Yalew

(57) ABSTRACT

A method and system for tracing-back single packets based on storing only one record per flow, 'FlowId', observed by a router on a given interface and in a given time window 'Time Period'. This record can be seen as a canonical representation for all packets seen during this window. A malicious packet may be traced back to its origin by identifying the port of arrival based on that packet time of arrival X and the FlowId.

21 Claims, 2 Drawing Sheets

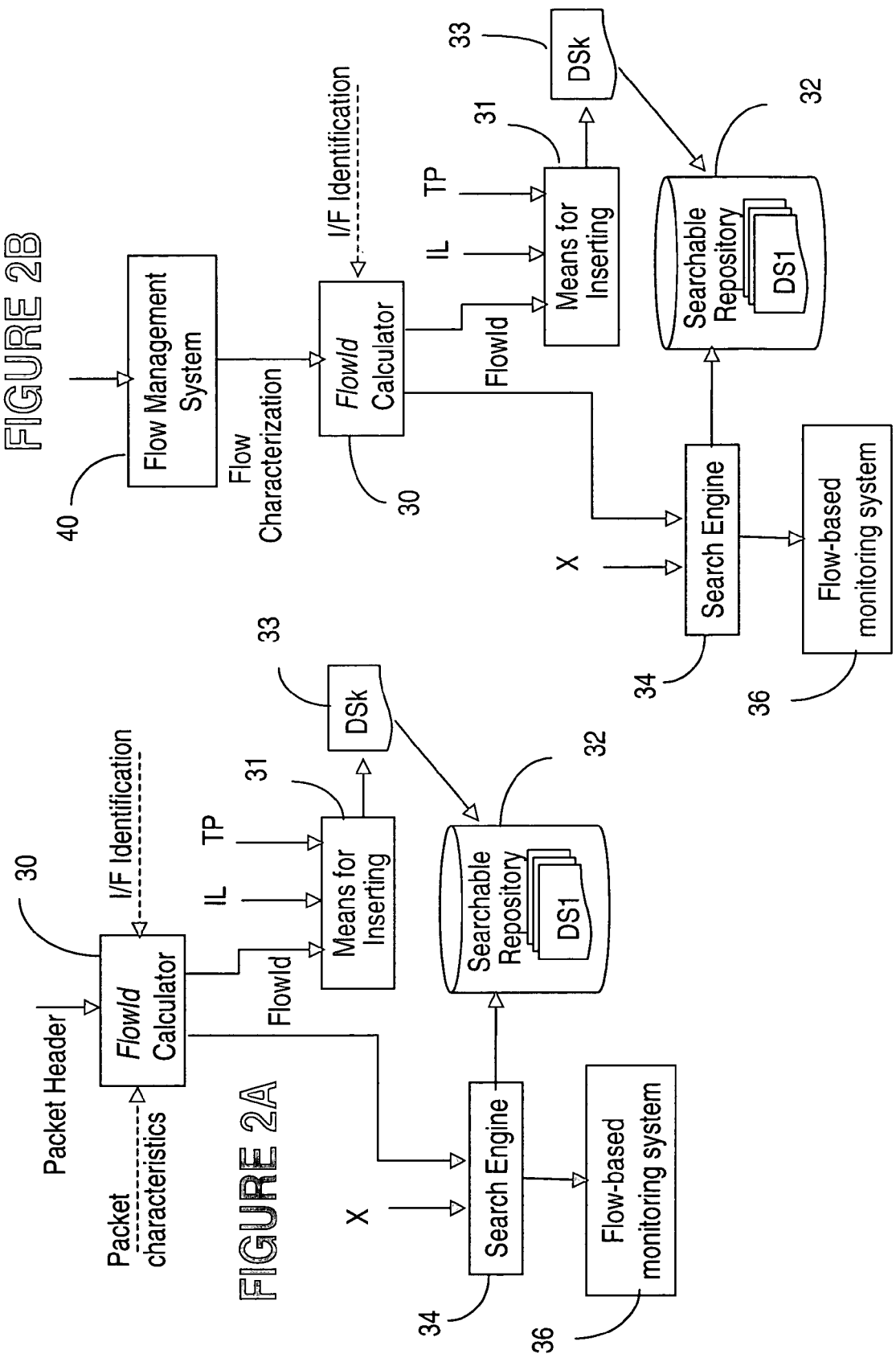

FLOW-BASED METHOD FOR TRACKING BACK SINGLE PACKETS

FIELD OF THE INVENTION

This invention relates to communications systems and more particularly to an apparatus and method for tracing-back single packets in such communications systems.

BACKGROUND

Global-based communications networks such as the Internet have evolved from an early, research-based system with limited access, to a truly world wide network with millions of users. The original network protocol, TCP/IP, was designed on the basis that system users would connect to the network for strictly legitimate purposes. As a consequence, no particular consideration was given to security issues. In recent years, however, the incidence of malicious attacks on the Internet has grown to an alarming proportion. These attacks take on a variety of forms, and often lead to a complete disruption of service for a targeted victim.

One such attack is based on the concept of flooding a victim with so much traffic that the victim's server cannot cope, or with very effective malicious packets at lower rates. Due to its anonymous nature, the Internet Protocol (IP) makes it extremely difficult to precisely identify the real source of any given datagram, and thus any given flow, if the source wishes to remain unknown. This peculiarity is often exploited, during a malicious Denial of Service (DoS) attack, to hide the source of the attack. A DoS attack involves blocking somebody's ability to use a given service on the network. DoS attacks are common across the Internet with many being launched daily at various targets.

Thus, it is very difficult to trace the real source of the attack if an attacker uses a spoofed source address, i.e. replaces its legitimate address with an illegitimate one. It is expected that if attackers were open to identification the incidence of DoS attacks would decrease significantly.

Several methods have been proposed for solving the IP trace back problem. A thorough overview on the topic is given by H. F. Lipson in a special report entitled "Tracking and Tracing Cyber-Attacks: Technical Challenges and Global Policy Issues", CERT Coordination Center. Among all the other techniques that this paper describes, a hop-by-hop trace back scheme is discussed. This mechanism consists of a manual and tedious process by which a network administrator gathers information on each router on the upstream path of the flow being traced one step at a time until the source is reached.

Other prior art solutions involve systems where routers are requested to insert their IP addresses, or other unique identifiers, into the IP packet headers. The victim of an attack reconstructs the path by using the information gathered by correlating all the received, marked datagrams. This system is described by S. Savage, D. Wetherall, A. Karling and T. Anderson in "Practical Network Support for IP Trace back", SIGOMM'00, Stockholm, Sweden.

Another back-tracing method is iTrace, which relies on routers sending a new type of Internet control message protocol (ICMP) message to the destination of the datagram examined with a certain probability. By gathering a given number of these messages the receiver of a certain flow can reconstruct the path to the source. This method is described by S. Bellovin, M. Leech, T. Taylor, "ICMP Trace back messages", IETF work in progress.

Finally, the third classical approach is to rely on routers keeping track of all packets they forward in some efficient matter. In a hash-based solution every router keeps a table containing a hashed value from every packet forwarded during a given interval. If a particular flow is to be traced, routers on the upstream path forward their tables to an entity that will carry out a correlation process to determine the next hop. The method relies on Bloom filters to speed up the look-up process in the table. This method was described by C. Snoeren, C. Patridge, L. Sanchez et al., "Hash-based IP Trace back", SIGCOMM'01, San Diego.

The Applicant's co-pending U.S. patent application Ser. No. 10/635,602, filed Aug. 7, 2003 for a "Mechanism for Tracing-back Anonymous Network Flows in Autonomous Systems" (Jones et al.) focuses on how to trace a data flow from one end of a single autonomous system to another, given the signature and the egress point of the flow.

The previous solutions can be divided into two categories. The first one includes methods for tracking malicious continuous flows of IP packets and the second group includes the methods for tracking back single malicious IP packets. Some of the methods for tracking continuous flows may also be used to track-back single packets, such as for example the iTrace method referred to above. However, the price to pay is overwhelming.

Tracing-back single packets is still an unsolved problem, particularly if the tracking process contemplates minimizing the space requirement to store the intermediate data at each node. The hash-based solution identified above (Snoeren et al.) is in fact the only practical solution for tracking-back single malicious IP packets. Still, this solution is expensive for high-end core routers. For example, a router with 32 OC-192 links will need up to 30 Gbytes of memory to store one minute of traffic. On top of this, the time to update such a data structure will have to be added to the processing time of each single packet forwarded by a router.

SUMMARY OF THE INVENTION

It is an object of the invention to provide a flow-based method for tracking-back single IP packets that alleviates totally or in part the drawbacks of the current methods.

It is a further object of the invention to provide a flow-based method for tracking-back single IP packets towards their respective origin, whilst minimizing the space requirements for storing intermediate data at each router on the path of these packets.

Accordingly, the invention provides a method of tracking-back a malicious data packet in a connection-oriented communication network, comprising the steps of: a) for a given time window (Time Period), computing a unique flow identifier (FlowId) for each packet of a given flow seen by a router interface (Incoming Link) at a network node; b) inserting the FlowId into a data structure associated to the Time Period and the Incoming Link, available at the network node; c) storing the data structure in a searchable repository; and d) repeating steps a) to c) for a next Time Period and for each Incoming link at the network node.

The invention also provides a method of tracking-back a malicious data packet in a connection-oriented communication network, comprising the steps of: a) for a given time window (Time Period), computing a flow identifier (FlowId) for a flow seen by a router interface (Incoming Link) at a network node, based on a flow characterization parameter obtained from a flow management system; b) inserting the FlowId into a data structure, associated to the Time Period and the Incoming Link, available at the network node; c) storing the data structure in a searchable repository; and d) repeating steps a) to c) for a next Time Period and for each Incoming link at the network node.

Also, the invention is directed to a system for tracking-back a malicious data packet in a connection-oriented communication, comprising: means for computing a unique flow identifier FlowId for each packet of a flow seen by a router interface (Incoming Link) at a network node, over a given period of time (Time Period); means for inserting the FlowId into a data structure associated to the Time Period, and the Incoming Link available for the network node; a searchable repository for storing the data structure; and a search engine for finding in the searchable repository the Incoming Link for the malicious packet based on the FlowId and a time of arrival X of the malicious packet.

Advantageously, the method according to the invention reduces the storage and the processing time per IP packet. It also integrates the track-back process with the flow management framework which records the IP flows.

This invention also enables the network operators with the ability to readily trace-back an IP flow carrying a spoofed source IP address, providing a valuable differentiator in the network equipment market. Moreover, blocking a flow at its source will help network service providers to reduce liabilities by preventing their resources' exploitation during DoS attacks.

BRIEF DESCRIPTION OF THE DRAWINGS

The features and advantages of the invention will become more apparent from the following detailed description of the preferred embodiment(s) with reference to the attached diagrams wherein:

FIG. 2A illustrates a block diagram of the packet source identification system according to a first embodiment of the invention; and FIGS. 2B illustrate block diagrams of the packet source identification system according to a second embodiment of the invention.

DETAILED DESCRIPTION OF THE INVENTION

The method according to the invention uses the concept of packet flows. An example of flow definition can be found in IETF IPFIX (IP Flow Information Export) working group, IPFIX Protocol Specifications, draft-ietf-ipfix-protocol-00.txt, June 2003. This Protocol Specification defines a flow as:

"a set of IP packets passing an observation point in the network during a certain time interval. All packets belonging to a particular flow have a set of common properties. Each property is defined as the result of applying a function to the values of:

1. One or more packets header fields (e.g. destination IP address), transport header field (e.g. destination port number), or application header field (e.g. RTP header field [RFC 1889]

2. One or more characteristics of the packet itself (e.g. number of MPLS labels, etc)

3. One or more fields derived from packet treatment (e.g. next hop IP address, the output interface, etc.)

A packet is defined to belong to a flow if it completely satisfies all the defined properties of the flow."

The present invention proposes to store only one record per flow served by a router in a given time period. This record can be seen as a canonical representation for all packets of each given flow seen during the respective period. Preferably, a flow is defined here in conformity with the IPFIX Protocol Specification. It is to be noted that other attributes or/and fields of a packet may be used to define a packet flow; the invention is not limited to the above IETF IPFIX definition. In a worst-case scenario, where all flows are composed of single packets, the method of the present invention reduces to the current hash methods described above (described in Snoeren at al.).

This approach reduces importantly the memory space necessary for storing the track-back information. W. Fang and L. Peterson analyzed the Internet traffic, and concluded in the paper entitled "Inter-AS traffic patterns and their applications", IEEE GLOBECOM, 1999, that 10% of the traffic flows are composed of more than 90% of the packets. This implies that a small number of flows carry a large number of packets.

According to the invention, each flow of IP packets seen by a given router interface during a given period of time, "Time Period", is represented by a flow identifier "FlowId". This flow identifier is inserted in an appropriate data structure associated to the given router interface and to the respective "Time Period". The "Time Period" is selected according to the data structure size, and the FlowId is calculated based on a respective definition of a packet flow.

Figure 1B:
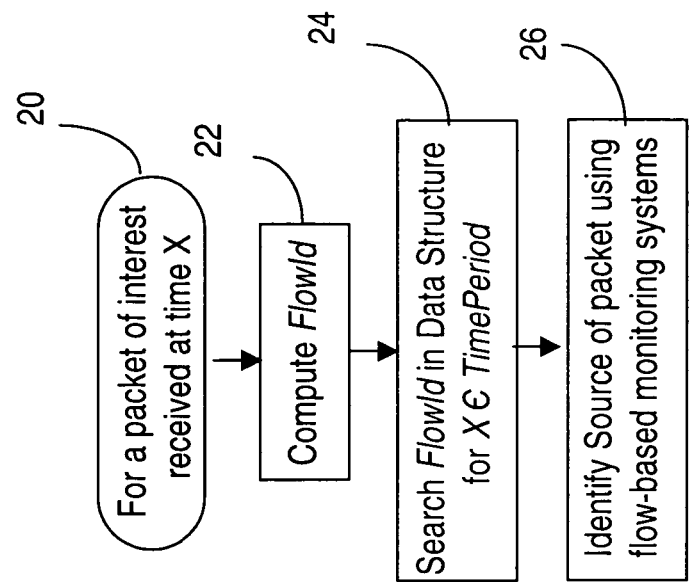
FIG. 1B is a flowchart showing identification of the source of a malicious packet.
Figure 1A:
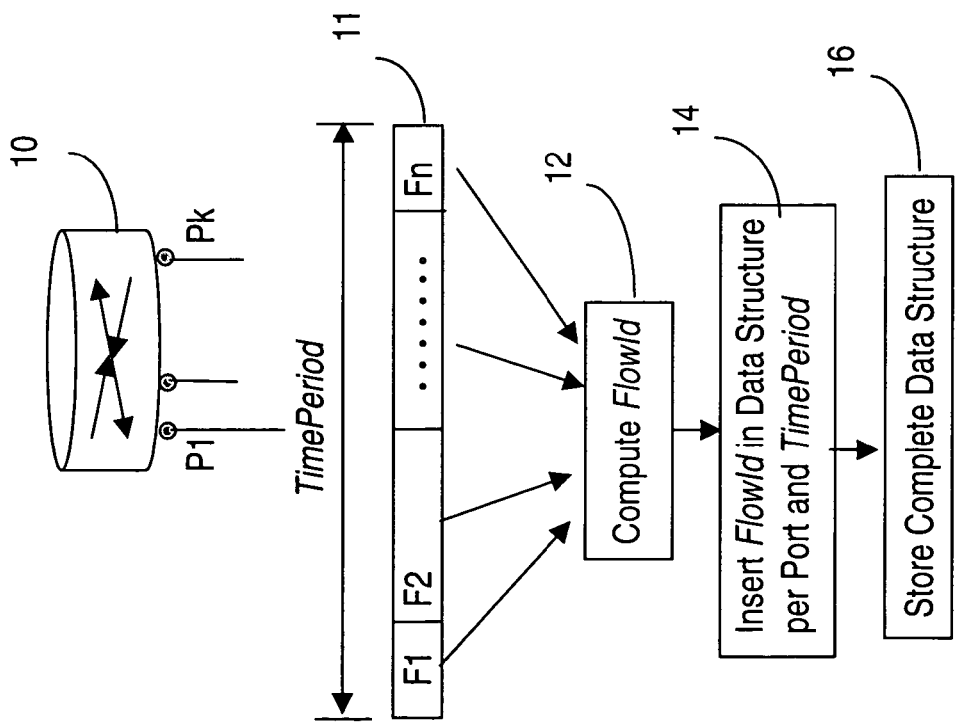
FIG. 1A is a flowchart showing the method of inserting flow identifiers in a data structure.

FIG. 1A is a flowchart of the method of storing the FlowId in the data structure. A k-port router 10 receives over time window Time Period intermixed packets from different flows F1, F2 . . . Fn, as shown at 11. It is to be noted that FIG. 1A shows successive flows for simplicity. However, the flows may overlap; nonetheless, what matters is that the FlowId is calculated for each packet during the respective window Time Period.

First, a unique flow identifier FlowId is computed in step 12, preferably based on the IPFIX properties. For example, an identifier which is derived by using a given function from the IP source and destination addresses, UDP/TCP source and destination ports, and the protocol identifier. In this case, the function can be based on a hashing function. Obviously, other methods can be derived similarly, accordingly to the definition used for a packet flow.

The value FlowId is inserted into the data structure as shown in step 14. Such a data structure may be a hash table based on the Bloom filter as defined in the above referenced paper by Snoeren et al. However, this is not the only choice. Any efficient data structure supporting multiple redundant insertions and query operations can be used instead of the hash table.

These operations can be performed for each received packet by the monitoring process of the router or the router interface. More efficiently, these operations can be performed for each flow record generated by a flow management system.

At the end of each Time Period, the data structure containing the flow identifiers seen by the respective router interface is stored for future queries, step 16.

FIG. 1B is a flowchart showing identification of the source of a malicious packet, received at a certain time, denoted with "X". This is shown at step 20. Such a packet is defined as "malicious" only because there is a specific interest in tracking the source of malicious packets; it is to be understood that the invention could be used to track any single packet of interest. To this end, a flow identifier FlowId is computed first for this packet, as above and shown in step 22. Then, the value FlowId is searched for in the data structure associated with a respective router interface Incoming Link and with a Time Period that includes time X, as shown in step 24. The query will recognize if the packet has been seen by the Incoming Link during the Time Period.

It is also to be noted that the query may be repeated for the data structures corresponding to an anterior and a posterior Time Period for the case that the malicious packet was received at a time at the border between two consecutive time windows.

Once these data structures have been defined and used, classical hop-by-hop trace-back mechanisms presented in the literature can be used, as shown in step 26 or more efficiently has described by Snoeren et al.

FIG. 2A illustrates a block diagram of the packet source identification system according to a first and respectively a second embodiment of the invention. In this example, a calculator 30 determines the FlowId for each packet of the flow based on selected fields from the packet header, as discussed above.

An alternative solution to minimize the number of data structures to maintain per router is to incorporate the routing interface information in the computation of the flow identifier. Hence, determination of the flow identifier FlowId at the router interface can be performed using IPFIX properties and a routing interface parameter. Still further, packet characteristics may be added or may be used to replace some of the header fields. In general, the values used for calculating FlowId should be consistent with the definition adopted for the packet flow.

FIG. 2A shows generically means for insertion 31 that insert the FlowId, Time Period and Incoming Link in each data structure 33 for each window. Once a data structure for a window is completed with this information, it is stored in a searchable repository 32 for future use. A search engine 34 is used to locate the data structure associated to the given Time Period. Then, the search is performed in the data structure 33 for the window including the time of arrival X of the malicious packet; a neighboring window may also be searched.

Once the FlowId of the malicious packet is detected in the data structure retrieved from the repository 32, a flow-based monitoring system 36 uncovers the source of the packet by using classical hop-by-hop trace-back mechanisms based on the Incoming Link information in the data structure, which provides the port of arrival of the malicious packet.

FIG. 2B illustrates a second embodiment of the invention where a flow characterization parameter is used to calculate the FlowId for each flow, rather that calculating the FlowId for each packet. The only difference with the embodiment of FIG. 2A is that in this case, the node is equipped with a flow management system 40 that provides flow characterization information to calculator 30. Calculator 30 uses this information to compute FlowId for the entire flow, rather than for each packet of a flow.

If the information 32 is kept locally on the routers, someone who wants to determine the path of a given malicious IP packet can query the closest router and trace-back the packet hop-by-hop from the victim, which has identified the packet as malicious, toward the potential sources. The route may branch out if more than one link is kept for a flow identifier at a given router.

Alternatively, if the information 32 is centralized, someone who wants to determine the entry point of a given malicious packet can query all the data structures in a given time window.

If the routing interface information is incorporated in the determination of the flow identifier FlowId, only one data structure per router can be used to keep the flow identifiers and their related router interfaces. The price to pay for such unified approach is to accept to do multiple queries, one for each router interface for the respective router.

The solution that allows tracing back single packets according to the invention may be integrated into IPFIX collectors or may be integrated with any similar flow-based monitoring systems as Netflow, sFlow, rMon, RTFM, etc. It reduces the storage and the processing time per IP packet. It also integrates the track-back process with the flow management, which records the IP flows.

I claim:

1. A method of tracking-back a single malicious data packet in a connection-oriented communication network including a network node comprising a plurality of router interfaces, the method comprising the steps of:
   a) for a given time window of a predetermined length, computing a flow identifier that uniquely identifies a given flow seen by a respective router interface at said network node;
   b) inserting said flow identifier into a data structure storing flow identifiers computed at said respective router interface during said time window;
   c) storing said data structure in a searchable repository at said network node;
   d) repeating steps a) to c) for a plurality of successive time windows, wherein each router interface stores a separate data structure for each time window;
   e) determining an arrival time window including a time of arrival of said single malicious packet at said network node, and computing a flow identifier for said single malicious packet; and
   f) identifying said router interface for said single malicious packet by searching for the flow identifier of said single malicious packet in all data structures stored at said network node that contain data for said arrival time window.

2. The method of claim 1, further comprising tracing-back hop by hop the source of said single packet from said router, by performing steps e) and f) for each network node along the path of said single malicious packet.

3. The method of claim 1, wherein step a) is based on a flow definition adopted for said network.

4. The method of claim 1, wherein step a) comprises applying a specified function to one or more header fields of each packet received in said flow.

5. The method of claim 1, wherein step a) comprises applying a specified function to one or more header fields of each packet received in said flow and an incoming interface identification parameter.

6. The method of claim 1, wherein step a) comprises applying a specified function to one or more characteristics of each packet.

7. The method of claim 1, wherein step a) comprises applying a specified function to one or more characteristics of each packet received in said flow and an incoming interface identification parameter.

8. The method of claim 1, wherein said data structure is a hash table based on a Bloom filter.

9. The method of claim 1, wherein said searchable repository is maintained for each router interface at said network node.

10. The method of claim 9, wherein said searchable repository stores all said data structures for all router interfaces at said network node.

11. The method of claim 1, wherein said searchable database is a centralized searchable repository maintained for said network.

12. A method of tracking-back a single malicious data packet in a connection-oriented communication network including a network node comprising a plurality of router interfaces, the method comprising the steps of:
   a) for a given time window of a predetermined length, computing a flow identifier that uniquely identifies a given flow seen by a respective router interface at said network node based on a flow characterization parameter obtained from a flow management system;
   b) inserting said flow identifier into a data structure storing flow identifiers computed at said respective router interface during said time window;
   c) storing said data structure in a database that is a centralized searchable repository;
   d) repeating steps a) to c) for a plurality of successive time windows, wherein each router interface stores a separate data structure for each time window; and
   e) finding, in said searchable repository, the router interface for said single malicious packet by searching for a corresponding flow identifier in all data structures containing data for an arrival time window, wherein the arrival time window includes a time of arrival of said single malicious packet.

13. A system for tracking-back a single malicious data packet in a connection-oriented communication, comprising:
   means for computing a flow identifier that uniquely identifies a given flow seen by a router interface at a network node during a given time window of a predetermined length;
   means for inserting said flow identifier into a data structure storing flow identifiers computed at said router interface during said time window;
   a database that is a centralized searchable repository for storing said data structure; and
   a search engine for finding, in said searchable repository, the router interface for said single malicious packet by searching for a corresponding flow identifier in all data structures containing data for an arrival time window wherein die arrival time window includes a time of arrival of said since malicious packet.

14. The system of claim 13 further comprising a flow-based monitoring system for tracking back hop-by-hop the source of said single malicious packet.

15. The system of claim 13, wherein a searchable repository is maintained for each interface at said network node.

16. The system of claim 13, wherein a searchable repository is maintained for said network node.

17. The system of claim 13, wherein said searchable repository is a centralized database maintained for said network.

18. The system of claim 13, further comprising a flow based monitoring system for providing a flow characterization parameter to said means for calculating.

19. The system of claim 13 further comprising a flow management system for generating a flow characterization parameter.

20. The system of claim 19, wherein said means for computing is a flow identifier calculator for computing said flow identifier from at least one of packet header fields, packet characterization parameters, and interface identification information.

21. The system of claim 19, wherein said means for computing is a flow identifier calculator for computing said flow identifier from packet header information.

* * * * *